United States Patent [19]

Hoy et al.

[11] Patent Number: 4,971,775
[45] Date of Patent: Nov. 20, 1990

[54] PROCESS FOR REMOVAL OF NICKEL FROM EFFLUENT CONTAINING EDTA

[75] Inventors: Edgar F. Hoy; Stanley B. McConnell, both of Broken Arrow, Okla.

[73] Assignee: Dowell Schlumberger, Tulsa, Okla.

[21] Appl. No.: 68,472

[22] Filed: Jun. 30, 1987

[51] Int. Cl.$^5$ .................. C01G 49/00; C01G 53/00; C01G 3/00; C01G 9/00

[52] U.S. Cl. ........................... 423/140; 423/42; 423/43; 423/101; 210/688; 210/702; 210/719; 210/705; 210/725; 210/729

[58] Field of Search ............... 75/108; 423/42, 43, 423/101, 140, DIG. 1, DIG. 1 X; 210/688, 702, 719, 705, 725, 729

[56] References Cited

U.S. PATENT DOCUMENTS 4,419,246 12/1983 Jayawant ........................... 210/721
4,629,570 12/1986 Kennedy, Jr. ...................... 423/140

Primary Examiner—John Doll
Assistant Examiner—Steven J. Bos
Attorney, Agent, or Firm—Stephen A. Littlefield

[57] ABSTRACT

A method for removing iron(III), copper(II), zinc(I) and nickel(II) from an effluent containing chelant (EDTA, DEPA, HOEDTA) comprising treating the effluent with a soluble calcium compound (e.g., Ca(OH)$_2$, CaCl$_2$, Ca(NO$_3$)$_2$) in a molar equivalent to the chelant in combination with a monovalent hydroxide to a pH greater than 12.4 and then adding an effective amount of a dialkyldithiocarbamate (e.g.; sodium-N,N-diethyldithiocarbamate) to precipitate the metal hydroxides and nickel dialkyldithiocarbamate. Heating the solution to about 180 F. further speeds up the removal of the nickel(II). The nickel concentration of spent chelant cleaning solution can be reduced to less than 1 ppm.

6 Claims, 3 Drawing Sheets

TEMPERATURE EFFECT ON NICKEL REMOVAL VERSUS TIME
(0.5 gallons SDEDTC solution/ppm Ni per 1000 gallons waste)
(pH > 12.4, heated to temp. (~15 min), cooled to room temp.)

PROCESS FOR REMOVAL OF NICKEL FROM EFFLUENT CONTAINING EDTA

BACKGROUND OF THE INVENTION

1. Field of the Invention

The present invention relates to a method of removing nickel(II), iron(III) and copper(II) from a chelant containing solution. More specifically, the invention relates to a method of precipitating the nickel from a chelant complex at a pH greater than 12.4 in the presence of the replacement calcium ion and dialkyldithiocarbamate precipitant.

2. Description of the Prior Art

Scale deposits on equipment in electric power generation, chemical processing, refineries, and/or other industrial plants where water is used for heating and/or cooling are frequently removed with commercial chemical cleaning solvents containing a chelant such as the alkylene polyamine polyacetic acid chelants (e.g., the polyvalent anions of ethylenediamine tetraacetic acid, EDTA, diethylenetriamine pentaacetic acid, DEPA, and hydroxylethylenediamine triacetic acid, HO-EDTA) or certain organic polyfunctional acid chelants (e.g., the citrate anion). The reactions involved in the dissolution and chelation of metal scales are quite complex and involve a variety of chemical species. For example, spent chelant cleaning solution (i.e., after treatment and removal of scale from a ferrous metal surface), will frequently contain as much as several thousand parts per million (ppm) dissolved iron, up to several hundred ppm dissolved metals such as Cu, Cr, Ni or the like, and trace amounts of other metals as well as some free chelant. As such, the waste effluent from chelant cleaning solutions may be a hazardous or regulated waste.

The treatment or proper disposal of chelated metal ions found in waste effluent is now a recognized and accepted commercial necessity in view of current environmental regulations. Because of the presence of the chelated metal cation and associated stability of the complex, the commercially practical options are limited. Thus, it has been suggested that thermal decomposition of the chelant solution be employed or that such solutions be disposed of by deep well injection; however, neither alternative is considered cost effective. Furthermore, the known heavy metal recovery processes involving low temperature treatment of waste solutions with lime and caustic are ineffective, particularly when attempting to lower the nickel(II) concentration.

SUMMARY OF THE INVENTION

In view of the problems associated with removing nickel(II) from solution in the presence of a chelating agent, it has been discovered that starting with a chelated nickel(II) concentration typically up to about several hundred parts per million (ppm), the overall nickel(II) concentration in solution can be lowered to less than one ppm consistent with current environmental requirements, simultaneously with the removal of chelated metals such as Fe(III) and Cu(II). The treatment process involves taking advantage of the favorable kinetics at elevated temperatures in the presence of the calcium replacement ion and a dialkyldithiocarbamate, DADTC. The method of the present invention is preferably performed at elevated temperatures at a pH greater than 11 in the presence of a dialkyldithiocarbamate precipitant and the calcium ion, followed by flocculation and removal of precipitated metal hydroxides and nickel dialkylthiocarbamate.

Thus the method of removing iron(III), copper(II), zinc(I) and nickel(II) from a chelant containing solution, according to the present invention, comprises the steps of:

(a) adding to the chelant containing solution an amount of a soluble calcium compound equal to about a molar equivalent of the chelant;

(b) adding an effective amount of a monovalent hydroxide to precipitate metal oxides and to adjust the pH above about 12.4; and (c) adding an effective amount of a dialkyldithiocarbamate to precipitate the nickel(II).

Preferably the soluble calcium compound is selected from the group consisting of $Ca(OH)_2$, $CaCl_2$ or mixtures thereof and the solution is heated to a temperature in excess of 180° F. prior to precipitation of the nickel. Preferably the dialkyldithiocarbamate is added in an amount in excess of twice the sum of the molar equivalent of nickel(II) and copper(II).

It is an object of the present invention to provide a cost effective and efficient means of removing nickel and associated metals from a spent chelant waste cleaning solution. It is a further object to provide a method of enhancing the lability of the chelated nickel ion in alkaline solution such that nickel dialkyldithiocarbamate will precipitate, hence reducing the nickel concentration in the waste chelant solution And it is still a further object of the present invention to provide a replacement calcium ion during the aforementioned precipitation. Fulfillment of these objects and the presence and fulfillment of additional objects will be apparent upon complete reading of the specifications and claims taken in conjunction with the attached drawing.

DESCRIPTION OF THE PREFERRED EMBODIMENTS

Figure 1:
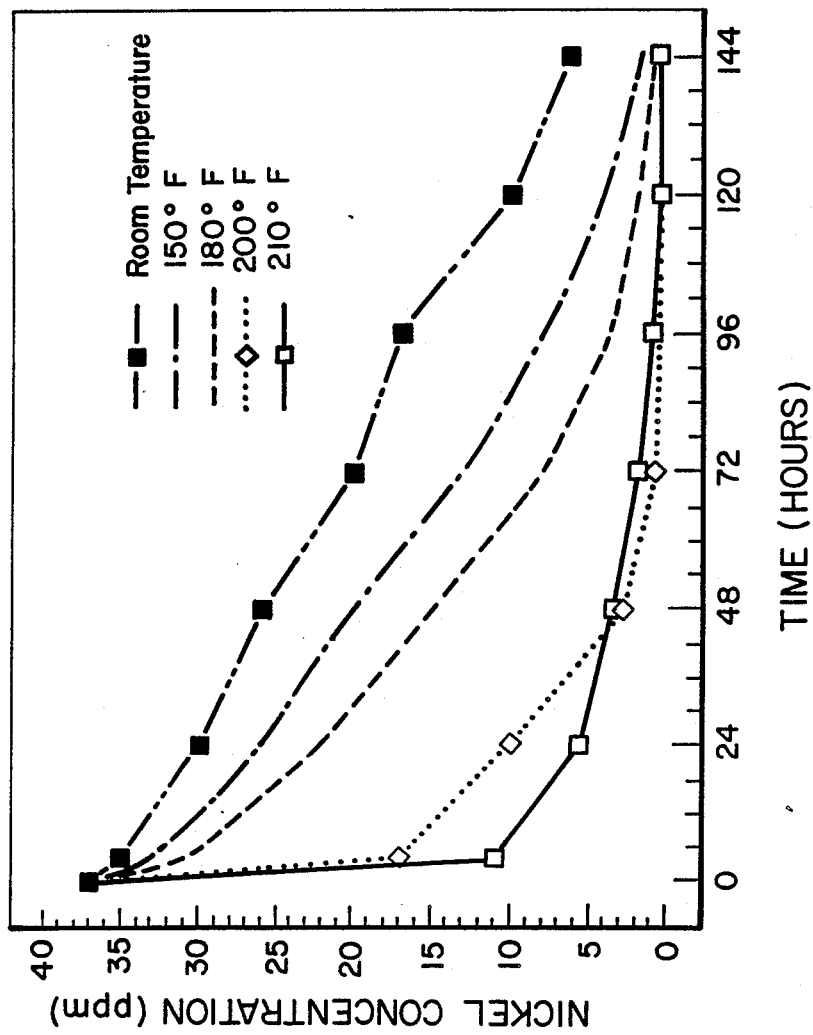
FIG. 1 illustrates a plot of the removal of nickel as a function of time at various temperatures.

Because of current governmental regulations and guidelines involving discharge of chemical waste solutions containing dissolved metals such as Fe, Cu, Ba, As, Ni, Cr, Hg, Ag, Se, Pb and the like into the environment, any such solutions containing, for example 2 ppm nickel(II), $Ni^{+2}$, potentially become a regulated waste. The presence of chelated nickel(II) or more specifically the inability to reduce the nickel content of waste solutions containing a chelating agent (e.g., chelant such as EDTA, DEPA, HOEDTA) further complicates and restricts the acceptable methods available to properly handle the waste during disposal. More specifically, the anion of ethylenediamine tetraacetic acid, herein designated as EDTA, in the presence of $Ni^{+2}$ forms a stable complex, Ni(II)-EDTA, which is extremely difficult to decrease in concentration. Specifically, the displacement and removal of the $Ni^{+2}$ from the Ni(II)-EDTA complex at room temperature can be considered kinetically and mechanistically an unfavorable reaction. As such, the $Ni^{+2}$ in the Ni(II)-EDTA complex is not considered as being readily labile at room temperature.

The present invention provides for a method of enhancing the lability of the nickel ion in the chelated nickel complex in the presence of calcium replacement ions under conditions that allow for the precipitation and isolation of other undesirable metal hydroxides and nickel(II) dialkyldithiocarbamate. More specifically, it has been discovered that by heating a nickel(II) containing waste solution in the presence of a soluble calcium compound and a dialkyldithiocarbamate, DADTC, at a pH of about 12.4 the kinetics of the formation and precipitation of the nickel(II)-2DADTC and other complexes and metal hydroxides are enhanced. For example, and as illustrated in the following chemical reaction scheme:

$$Ni(II)-EDTA+Ca^{+2} \rightleftharpoons Ni^{+2}+Ca-EDTA \qquad (1)$$

$$Ni^{+2}+2\ DADTC^- \rightarrow DADTC-Ni-DADTC_{ppt.} \qquad (2)$$

the lability and kinetics of the replacement reaction for $Ni^{+2}$ in the chelation complex is favored at a temperature in excess of 180° F. and pH of from about 10.0 to about 13.0, preferably 12.4 or greater to such an extent that the nickel dialkyldithiocarbamate will precipitate. It has been further discovered that in the absence of the soluble calcium compound the nickel will not be completely removed. Thus preferably the calcium replacement ion is employed in a molar amount equivalent to the chelant (i.e., an amount sufficient to stoichiometrically satisfy the right side of Equation (1) relative to the total chelant present).

The nickel(II) containing waste solution to be treated according to the present invention is categorically any aqueous media or solution containing both the $Ni^{+2}$ cation and a chelant in the presence of other dissolved metals. Typically such solutions are waste effluents or spent solutions used in industrial metal cleaning operations wherein a chelating agent is employed to enhance the removal of metal scale or metal containing compounds. As such, these waste effluents will typically contain other metals in solution with the chelated nickel. For example, a spent solution which has been employed to clean an iron or iron alloy metal surface will typically contain several thousand ppm dissolved iron as well as such dissolved metals as Cr, Ni, Cu and the like at concentrations approaching a hundred ppm as well as traces of other metals. Typically, treatment of such spent cleaning solutions according to the method of the present invention will simultaneously reduce all such metals to tolerable concentrations, except the chelated chromium, to below 1 ppm.

The chelant or chelating agent for which the present invention is effective is categorically any alkylenepolyamine polycarboxylic acid or salt thereof and related polydentate ligands as generally known in the art. Typically and most frequently this includes the well known anions of ethylenediamine tetraacetic acid (EDTA), diethylenetriamine pentaacetic acid (DEPA), and hydroxyl ethylenediamine triacetic acid (HOEDTA) which are known to chelate iron, chromium, copper, nickel and the like.

The preferred nickel(II), $Ni^{+2}$, precipitating agent or precipitant to be employed in the present invention is categorically a dialkyldithiocarbamate generally characterized by the formula:

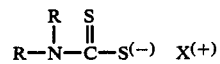

where: R is typically a $C_1$ to $C_4$ alkyl group including methly, ethyl, propyl, butyl and the like; and X is the companion cation typically Na, K, Li, H or the like. Thus by way of example but not limited thereto, this would include dimethyldithiocarbamate, diethyldithiocarbamate, sodium dimethyldithiocarbamate, sodium diethyldithiocarbamate, potassium dibuthyldithiocarbamate, and the like as well as the closely related compounds such as tetramethylthiuramonosulfide and tetramethylthiuramdisulfide.

The calcium replacement ion used according to the present invention to replace the nickel(II) in the nickel complex is generally derived from any calcium compound that can be rendered soluble in the waste solution being treated. As such any soluble calcium compound including by way of example but not limited thereto; $Ca(OH)_2$, $CaCl_2$, or mixtures thereof are particularly preferred but similar soluble salts such as the nitrate could also be used. The amount of calcium replacement ion employed is preferably that amount which is the molar equivalent to the chelant present as previously explained and as demonstrated more fully in the examples.

The monovalent hydroxide used to adjust the pH, according to the present invention, can be any such hydroxide as generally known in the art or any compound that hydrolyzes in situ to produce a similar alkaline solution. Thus the commonly available bases such as NaOH, KOH, mixtures thereof and corresponding solutions are particularly preferred but other such bases, basic anhydrides and related precursors are contemplated as being equivalent for purposes of this invention. It should be further appreciated that the effective amount of monovalent hydroxide employed is dependent on the starting pH of the waste solution and whether or not the soluble calcium compound is categorically a base (e.g., $Ca(OH)_2$ as exemplified later).

The actual pH at which the treatment according to the present invention is to be performed is preferably above about 12.4. The temperature at which the waste treatment of the spent nickel(II) containing chelant solution is to be performed in practising the present invention is preferably in excess of 180° F. and more preferably at temperatures approaching 200° F. and most preferably at 210° F. or above (i.e., reflux or near boiling). Although the kinetics of the removal of $Ni^{+2}$ from the nickel containing chelant, reaction (1), are believed to improve at temperatures in excess of 180° F., as a practical consideration the rate of reaction at or in excess of 200° F. is preferred for commercial use. As exemplified later, reaction time of the order of magnitude of 72 hours can be achieved on a typical spent EDTA commercial cleaning solution when the temperature approaches 200° F. or greater. In principle, more favorable kinetics and shorter time spans can be achieved at elevated temperatures by using sealed vessels at pressures above ambient.

Thus, the time and extent of nickel removal is directly dependent on the reaction temperature. In the aforementioned typical spent EDTA commercial cleaning solution, the nickel content can be reduced from about 40 ppm to less than 1 ppm, which is below current regulations governing nickel content of effluent.

Preferably once the metal hydroxides and the nickel dialkyldithiocarbamate precipitate are formed they are treated with a flocculating agent as generally known in the art before being isolated and removed from the solution by essentially any known and conventional technique. Typically a flocculating agent such as a polyacrylamide polymer can be employed prior to passing the treated waste solution containing precipitate through a 5 micron filter or the equivalent.

The following examples are presented to further illustrate the method according to the present invention.

EXAMPLE I

A 250 ml aliquot of a spent commercial chelant cleaning solution containing ethylenediamine tetraacetic acid (EDTA) as chelant, sold under the trade name VERTAN, containing about 3600 ppm Fe, 77 ppm Cu, 60 ppm Cr, 37 ppm Ni with 1% free EDTA chelant, was placed in a 400 ml beaker containing a magnetic stirring bar and air line sparge for mixing and aeration. A pH electrode was immersed in the solution and the assembly was placed on a laboratory magnetic stirrer. A slurry of 2.0 grams $Ca(OH)_2$ (i.e., grams hydrated lime={ppm Fe}{0.000556}) using approximately 10 ml of deionized water was added to the solution followed by 2.6 ml of 50% by weight NaOH solution resulting in a pH of 12.4. To this was added 5 ml (excess amount) of a 25% by weight active solution of sodium-N,N-diethyldithiocarbamate (i.e., ml needed={ppm Ni}{0.125}+{ppm Cu}{0.005}). The beaker was then placed on a preheated hot plate and heated with stirring to 200° F. When the temperature of the solution reached 200° F., the beaker was removed from the hot plate and placed on the magnetic stirrer. With stirring 1.5 ml of a 0.25% polyacrylamide polymer solution sold under the tradename SEPARAN was added to flocculate the metal hydroxides. After cooling, the solution was weighed and sufficient deionized water was added to return the solution to its original weight before treatment. The resulting solution was covered and allowed to stand for 72 hours before filtering approximately 10 ml of the supernatant through a 5 micron filter. The Ni concentration was then measured by atomic absorption on a Perkin-Elmer 5000 atomic absorption spectrophotometer. The metal analysis of the starting chelated waste solution indicated 37 ppm Ni while the resulting liquid phase after treatment indicated 0.7 ppm.

EXAMPLE II

In a manner analogous to Example I, a 250 ml aliquot of a second spent VERTAN solution was treated. The metal analysis of the starting chelated waste solution indicated 16 ppm Ni while the resulting liquid phase after treatment again indicated 0.7 ppm.

EXAMPLE III

In order to verify the efficacy of the sodium-N,N-diethyldithiocarbamate as the precipitant, the procedure described in EXAMPLE II was repeated, but the amount of sodium-N,N-diethyldithiocarbamate was decreased so that Cu was precipitated but not Ni (i.e., 1.6 gallons of 25% by weight active solution per 1000 gallons chelant waste or 0.4 ml "absolute" per 250 ml aliquot). The metal analysis of the respective metals was performed as a function of time after the addition of the precipitant. The resulting data are presenting in the following Table I confirming that Ni is not precipitated in the absence of dialkyldithiocarbamate precipitant.

TABLE I

|    | Initial   | 4 hr | 20 hr | 27 hr | 48 hr | 72 hr |
|----|-----------|------|-------|-------|-------|-------|
| Fe | 3580 ppm  | 0.8  | 0.9   | 0.8   | 1.0   | 0.7   |
| Ni | 36        | 36   | 36    | 36    | 35    | 37    |
| Cu | 77        | 3.8  | 4.2   | 4.4   | 4.3   | 4.0   |
| Cr | 62        | 27   | 27    | 27    | 28    | 27    |
| Zn | 20        | 0.3  | 0.5   | 0.5   | 0.4   | 0.3   |

EXAMPLE IV

In a manner analogous to Example III, the metal analysis of the supernatant was monitored as a function of time using sodium-N,N-diethyldithiocarbamate at a concentration sufficient to precipitate both Cu and Ni (i.e., 20 gallons of 25% by weigh active solution per 1000 gallons of chelant waste or 5 ml "absolute" per 250 ml aliquot). The metal analysis of the respective metals as presented in Table II below confirm that Ni precipitates in the presence of sufficient sodium-N,N-diethyldithiocarbamate precipitant.

TABLE II

|    | Initial   | 4 hr | 20 hr | 27 hr | 48 hr | 72 hr |
|----|-----------|------|-------|-------|-------|-------|
| Fe | 3580 ppm  | 1.4  | 0.9   | 0.8   | 1.0   | 0.7   |
| Ni | 36        | 17   | 12    | 7.5   | 2.8   | 0.7   |
| Cu | 77        | 0.2  | 0.2   | 0.2   | 0.2   | 0.2   |
| Cr | 62        | 31   | 33    | 32    | 33    | 32    |
| Zn | 20        | 0.5  | 0.7   | 0.7   | 0.6   | 0.5   |

EXAMPLE V

Four separate 250 gram samples of spent Vertan cleaning waste solution were weighed in 400 ml beakers containing a stirring bar and treated as follows. An air line was placed in each solution to provide mixing and aeration. A pH probe was immersed and magnetic stirrer turned on. Two grams of hydrated lime (1.00 gram/1800 ppm Fe) was slurried using approximately 10 ml deionized water and added to the VERTAN waste. The pH was adjusted to greater than 12.4 using a 50% by weight NaOH solution. Based on the removal of copper using a molar excess of a 25 wt. % active sodium-N,N-diethyldithiocarbamate (sodium-DEDTC) solution as precipitant, four different amounts of precipitant were added to the separate beakers to determine the effect of DEDTC on nickel(II) removal. The respective total ml of 25 wt. % active solution added to the 250 grams of waste chelant solution for precipitating the nickel(II) and copper(II) was calculated as follows:

25 times the amount used for copper={0.02}{25}=0.5 gallons sodium-DEDTC solution per ppm nickel per 1000 gallons waste being treated;

11.5 times the amount used for copper={0.02}{11.5}=0.23 gallons sodium-DEDTC solution per ppm nickel per 1000 gallons waste being treated;

4.65 times the amount used for copper={0.02}{4.65}=0.93 gallons sodium-DEDTC solution per ppm nickel per 1000 gallons waste being treated;

2.25 times the amount used for copper={0.02}{2.25}=0.045 gallons sodium-DEDTC solution per ppm nickel per 1000 gallons waste being treated.

Figure 2:
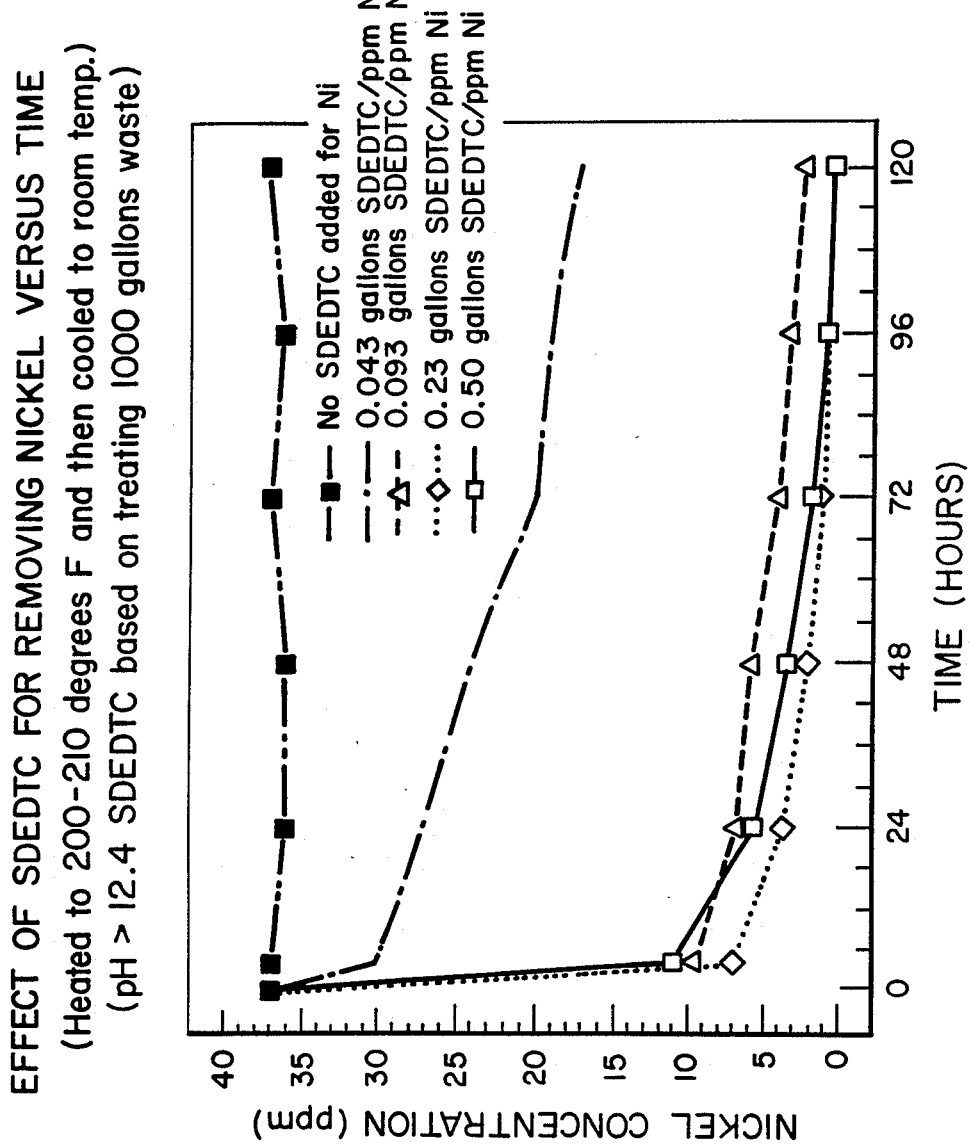
FIG. 2 illustrates a plot of the removal of nickel as a function of time at various concentrations of sodium-N,N-diethyldithiocarbamate.

The corresponding respective ml of precipitant solution was added using a disposable syringe and the solutions were placed on a hot plate with stirring. A thermometer was placed in the solution for monitoring the temperature. After the desired temperature was reached the solution was removed from the hot plate and placed on a magnetic stirrer 1½ ml of a 25 wt. % solution of a commercially available polyacryamide polymer solution sold under the tradename SEPARAN was added for flocculation of the metal hydroxides and the solution was cooled to room temperature. After cooling, deionized water was added to the solution for correcting the weight to the original starting weight before treatment. Using a disposable syringe, a 10 ml aliquot was withdrawn from the layer above the flocced metal precipitate phase at time intervals. The aliquot was filtered using a Millipore filter holder containing a 5 micron filter. The filtered solution was then tested for concentration of Fe, Cr, Ni, Zn, and Cu using a Perkin-Elmer 5000 atomic absorption spectrophotometer. The results for removal of Ni are presented in FIG. 2.

EXAMPLE VI

In a manner analogous to Example V, a further series of 250 gram samples of the spent VERTAN cleaning solution was treated. In one sample 1.6 gallons of 25 wt. % active sodium-DEDTC per 1000 gallons of waste (i.e., amount sufficient to complex and remove the copper(II)—0.02 gal/ppm Cu) was employed. In the other samples, 20 gallons of 25 wt. % active sodium-DEDTC per 1000 gallons of waste (i.e., amount sufficient to complex and remove copper(II) and Nickel(II)—0.02 gal/ppm Cu+0.5 gal/ppm Ni) were employed at various temperatures. The results of the 200° F. precipitations at 1.6 and 20 gallons of precipitant per 1000 gallons of waste are presented in the following Table III while FIG. 1 shows the effect of temperature on nickel removal at the 20 gallon of precipitant solution per 1000 gallons of spent chelant solution.

TABLE III

| Initial | 4 | 20 | 27 | 48 | 72 | (hours) |
|---|---|---|---|---|---|---|
| Soln. A: 1.6 gallons precipitant/1000 gallons VERTAN waste | | | | | | |
| Ni | 37 | 36 | 36 | 36 | 35 | 37 | (ppm) |
| Cu | 77 | 3.8 | 4.2 | 4.4 | 4.3 | 4.0 | (ppm) |
| Soln. B: 20 gallons precipitant/1000 gallons VERTAN waste | | | | | | |
| Ni | 37 | 17 | 12 | 7.5 | 2.8 | 0.7 | (ppm) |
| Cu | 77 | 0.3 | 0.3 | 0.3 | 0.3 | 0.3 | (ppm) |

As seen in Table III, the time required to obtain a concentration of less than 2 ppm (state and city disposal limits) was about 72 hours (3 days). As seen in FIG. 1 the time (reaction kinetics) for lowering the nickel(II) level to less than 2ppm is affected by the temperature of the reaction. From the data, the critical amount of precipitant for lowering nickel(II) to less than 2 ppm in the shortest time is from between 0.093 to 0.23 gallons of 25 wt. % active SDEDTC solution per ppm Ni(II) per 1000 gallons spent chelant waste; i.e., an amount in molar excess relative to equations (1) and (2).

EXAMPLE VII

Figure 3:
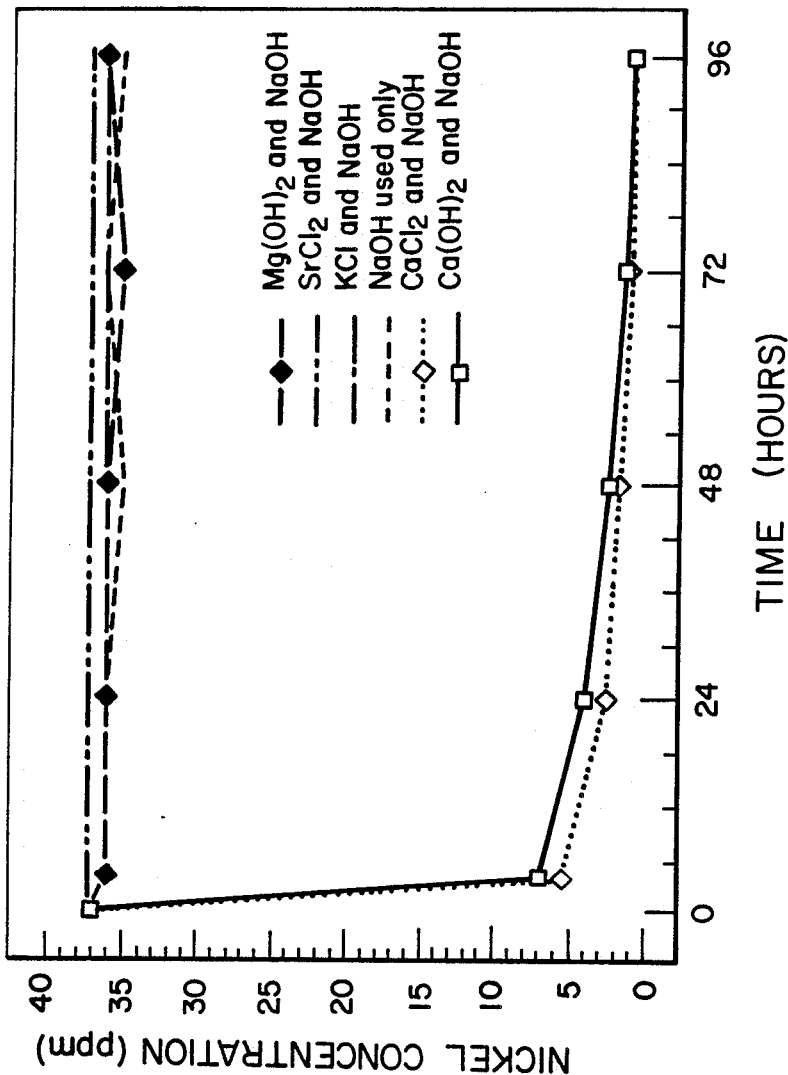
FIG. 3 illustrates a plot of the removal of nickel as a function of time using various alternative mono- and polyvalent replacement ions.

In a manner analogous to Example V, a series of 250 gram samples of the spent VERTAN cleaning solution was treated using various replacement compounds (i.e., SrCl₂ H₂O, CaCl₂, KCl, Mg(OH)₂ and NaOH) for the hydrated lime. In each treatment the alternate compound being evaluated was added at the previous Ca(OH)₂ addition step. The amount of the compound used was a molar equivalent to the amount of calcium added in Example V. In the case of Mg(OH)₂ the pH of the VERTAN waste solution was lowered to between 4 and 6 using 15% HCl before the addition of Mg(OH)₂. After the addition of the Mg(OH)₂ slurry, the solution was stirred for approximately 30 minutes to allow the pH to stabilize. The rest of the treatment procedure was identical to that of Example V. The results are presented in FIG. 3 along with the previous Ca(OH)₂ results and confirm that the presence of calcium is critical.

EXAMPLE VIII

In a manner analogous to Example V, 250 ml of a chelant containing waste was treated with 2 grams of Ca(OH)₂ resulting in a pH of 10.2 followed by 2.4 ml of 50% NaOH producing a pH of 12.48. Diethyldithiocarbamate (0.4 ml) was employed for complexing copper. The waste solution was heated to reflux for six hours. The starting and final metal analysis was as follows:

| | Cr | Ni | Cu | Fe | Ca | Zn | |
|---|---|---|---|---|---|---|---|
| Start | 77 | 37 | 82 | 3600 | 130 | 9 | (ppm) |
| Finish | 1.6 | 30 | .18 | 1.0 | 3 | 7 | |

EXAMPLE IX

In a manner analogous to Example V, 250 ml of a chelant containing waste was treated with 2 grams of Ca(OH)₂ resulting in a pH of 10.2 followed by 2.4 ml of 50% NaOH producing a pH of 12.5. Diethyldithiocarbamate (1.25 ml) was employed for complexing copper and nickel. The waste solution was heated to reflux for six hours. The starting and final metal analysis was as follows:

| | Cr | Ni | Cu | Fe | Ca | Zn | |
|---|---|---|---|---|---|---|---|
| Start | 77 | 37 | 82 | 3600 | 130 | 9 | (ppm) |
| Finish | 0.1 | 1.4 | 0.2 | 0.6 | 14 | 2 | |

EXAMPLE X

In a manner analogous to Example V, 250 ml of a chelant containing waste was treated with 2 grams of Ca(OH)₂ resulting in a pH of 10.2 followed by 2.4 ml of 50% NaOH producing a pH of 12.5. Diethyldithiocarbamate (2.5 ml) was employed for complexing copper and nickel. The waste solution was heated to reflux for six hours. The starting and final metal analysis was as follows:

| | Cr | Ni | Cu | Fe | Ca | Zn | |
|---|---|---|---|---|---|---|---|
| Start | 77 | 37 | 82 | 3600 | 130 | 9 | (ppm) |
| Finish | 0.1 | 0.67 | 0.25 | 0.9 | 21 | 0.4 | |

EXAMPLE XI

In a manner analogous to Example V, 250 ml of a chelant containing waste was treated with 2 grams of Ca(OH)₂ resulting in a pH of 10.1 followed by 2.4 ml of 50% NaOH producing a pH of 12.46. No diethyldithiocarbamte was employed. The waste solution was heated to reflux for six hours. The starting and final metal analysis was as follows:

| | Cr | Ni | Cu | Fe | Ca | Zn | |
|---|---|---|---|---|---|---|---|
| Start | 77 | 37 | 82 | 3600 | 130 | 9 | (ppm) |

-continued

|        | Cr  | Ni | Cu | Fe  | Ca | Zn |
|--------|-----|----|----|-----|----|----|
| Finish | 0.1 | 37 | 36 | 0.9 | 3  | 9  |

EXAMPLE XII

In a manner analogous to the previous examples, 250 ml of a chelant containing waste was treated with 4.3 ml of 50% NaOH producing a pH of 12.44 without addition of Ca(OH)$_2$. Diethyldithiocarbamate (2.5 ml) was employed for complexing copper and nickel. The waste solution was heated to reflux for six hours. The starting and final metal analysis was as follows:

|        | Cr | Ni | Cu  | Fe   | Ca  | Zn |       |
|--------|----|----|-----|------|-----|----|-------|
| Start  | 77 | 37 | 82  | 3600 | 130 | 9  | (ppm) |
| Finish | 40 | 37 | 0.2 | 37   | 30  | 3  |       |

EXAMPLE XIII

In a manner analogous to the previous examples, 250 ml of a chelant containing waste was treated with 3.4 grams of CaCl$_2$ resulting in a pH of 10.1 followed by 4.2 ml of 50% producing a pH of 12.5. Diethyldithiocarbamate (2.5 ml) was employed for complexing copper and nickel. The waste solution was heated to reflux for six hours. The starting and final metal analysis was as follows:

|        | Cr  | Ni  | Cu  | Fe   | Ca  | Zn |       |
|--------|-----|-----|-----|------|-----|----|-------|
| Start  | 77  | 37  | 82  | 3600 | 130 | 9  | (ppm) |
| Finish | 1.4 | 3.4 | 0.2 | 0.3  | 8   | 1  |       |

EXAMPLE XIV

In a manner analogous to the previous examples, 250 ml of a chelant containing waste was treated with 3.5 grams of Mg(OH)$_2$ resulting in a pH of 8.7 followed by 3.7 ml of 50% NaOH producing a pH of 12.4. Diethyldithiocarbamate (1.25 ml) was employed for complexing copper and nickel. The waste solution was heated to reflux for six hours. The starting and final metal analysis was as follows:

|        | Cr  | Ni | Cu  | Fe   | Ca  | Zn |       |
|--------|-----|----|-----|------|-----|----|-------|
| Start  | 77  | 37 | 82  | 3600 | 130 | 9  | (ppm) |
| Finish | 0.9 | 14 | 0.7 | 1.0  | 21  | 3  |       |

EXAMPLE XV

In a manner analogous to the previous Example V, a 750 ml sample of VERTAN waste solution was treated at reflux temperature with an excess of diethyldithiocarbamate, DEDTC. The results of the removal of metals relative to the initial concentrations and relative to sufficient DEDTC to precipitate copper only is presented below.

|    | Initial | Cu Only | Reflux Time |         |         |
|----|---------|---------|-------------|---------|---------|
|    |         |         | 1 hour      | 30 min. | 15 min. |
| Fe | 4100    | 3       | 2.0         | 2.0     | 3.0     |
| Ni | 340     | 330     | 0.3         | 0.9     | 12.0    |
| Cu | 320     | 23      | 0.5         | 0.5     | 0.5     |
| Cr | 6       | 6       | 0.6         | 0.3     | 0.9     |
| Zn | 760     | 570     | 4.0         | 4.0     | 4.0     |

EXAMPLE XVI

In order to implement the method according to the present invention for use in the field, air agitation of the treatment tank containing the waste chelant solution is begun to aid mixing. A slurry of lime is added to the tank (i.e., pounds of lime added={ppm Fe}{0.000556}{4} {# of gallons}{3.78}/{4.53}). A 50% NaOH solution is then pumped into the treatment tank until pH greater than 12.4 is reached. An excess amount of a 25% by weight active sodium-N,N-diethyldithiocarbamate solution is added to the tank (i.e., gallons of sodium-DEDTC=[{ppm Ni}{0.058}+{ppm Cu}{0.005}]{# of gallons being treated}/250). The treated solution is then circulated to a heat exchanger to obtain a temperature greater than 210° F. and residence time greater than 15 minutes. The solution is cooled to 200° F. and pumped to a holding tank for further air agitation. While the solution is warm, 6 gallons of a 0.25% by weight solution of polyacrylamide polymer is added for every 1000 gallons of solution being treated. After settling for approximately 72 hours, the top liquid layer is tested for nickel concentration by atomic absorption after filtering through a 5 micron filter. Upon reaching the desired nickel level, the supernatant is filtered and the remaining sludge is processed in a frame filter press.

The advantages associated with the present invention are considered significant. First and foremost the process (method) according to the present invention is far more cost effective than the previous process of thermal decomposition of the chelant or disposal by deep well injection. For example, the vast majority (>90%) of the chelant waste cleaning solution is water. Therefore, a major cost of using thermal decomposition methods inherently involves the cost of removing the water before the thermal decomposition of the chelant takes place.

Under some state and city regulations/guidelines only certain deep well injection sites can be used for the disposal of the nickel containing chelant solution. These site locations may require the solutions to be transported under interstate government hazardous waste regulations. And again, the hauling costs for such hazardous waste will inherently involve transporting predominantly water. Also, the method according to the present invention is far more effective in achieving a lower concentration of nickel than the previously known room temperature caustic and lime treatment. As such, the present invention provides a convenient, cost effective and efficient method of removing nickel and other metals from a spent chelant waste cleaning solution or the like.

Having thus described the invention with a certain degree of particularity, it is to be understood that the invention is not limited to the embodiments set forth herein for purposes of exemplification, but is to be limited only by the scope of the attached claims, including a full range of equivalents to which each element thereof is entitled.

We claim:

1. A method of removing iron(III), copper(II), zinc(I) and nickel(II) from a chelant containing solution wherein the chelant is selected from the group consisting of EDTA, DEPA, HOEDTA and the citrate anion, the method comprising the steps of:
   (a) adding to the chelant containing solution an amount of a soluble calcium compound equal to about a molar equivalent of the chelant;
   (b) adding an effective amount of a monovalent hydroxide to precipitate metal oxides and to adjust the pH above about 12.4;
   (c) heating said solution to a temperature of at least about 180° F.; and
   (d) adding an amount of dialkyldithiocarbamate in excess of twice the sum of the molar equivalent of nickel(II) and copper(II) to precipitate the nickel-(II).

2. A method of claim 1 wherein the chelant is EDTA and the monovalent hydroxide is NaOH.

3. A method of claim 1 wherein said dialkyldithiocarbamate is selected from the group consisting of: dimethyldithiocarbamate; diethyldithiocarbamate; sodium dimethyldithiocarbamate; sodium diethyldithiocarbamate; potassium dibutyldithiocarbamate; tetramethylthiurammonosulfide; tetramethylthiuramdisulfide and colbalt diethyldithiocarbamate.

4. A method of claim 3 wherein the chelant is EDTA and the monovalent hydroxide is NaOH.

5. A method of removing iron(III), copper(II) and nickel(II) from a chelant containing solution wherein the chelant is selected from the group consisting of EDTA, DEPA, HOEDTA and citrate anion, the method comprising the steps of:
   (a) adding to the chelant containing solution an amount of a soluble calcium compound equal to about a molar equivalent of the chelant;
   (b) adding an effective amount of a monovalent hydroxide to precipitate metal oxides and to adjust the pH above about 12.4;
   (c) heating said solution to a temperature of at least about 180° F.; and
   (d) adding an amount of sodium-N,N-dialkyldithiocarbamate in excess of twice the sum of the molar equivalent of nickel(II) and copper(II) to precipitate the nickel(II).

6. A method of claim 5 wherein the chelant is EDTA and the monovalent hydroxide is NaOH.

* * * * *